United States Patent [19]

Porubcan et al.

[11] 3,897,307

[45] July 29, 1975

[54] STABILIZED DRY CULTURES OF LACTIC ACID-PRODUCING BACTERIA

[75] Inventors: Randolph S. Porubcan, West Allis; Robert L. Sellars, Waukesha, both of Wis.

[73] Assignee: Chr. Hansen's Laboratory, Inc., Milwaukee, Wis.

[22] Filed: Oct. 23, 1974

[21] Appl. No.: 517,371

[52] U.S. Cl. ..................... 195/59; 195/100; 426/61
[51] Int. Cl............................................... C12k 1/00
[58] Field of Search ........... 195/48, 99, 100, 56, 59; 426/61

[56] References Cited
UNITED STATES PATENTS

| | | | |
|---|---|---|---|
| 3,075,887 | 1/1963 | Silliker et al......................... | 195/100 |
| 3,677,897 | 7/1972 | Jeffreys................................. | 195/56 |

*Primary Examiner*—A. Louis Monacell
*Assistant Examiner*—C. A. Fan

[57] ABSTRACT

The stability of dried cultures of lactic acid-producing bacteria is potentiated by incorporating in the fermented culture, prior to drying thereof, a combination of ascorbate with either glutamate or aspartate. These co-acting potentiators can be added as free acids or as water-soluble salts. The invention has particular utility in home use preparations; namely, in stabilizing dried cultures of Yogurt and/or acidophilus bacteria, either prepared as a powder for home fermentation application, or prepared as tablets for oral consumption. In general, the invention can be employed in the preparation of any dried lactic acid producing bacterial culture, including cultures for the commercial manufacture of cheese and related food products.

17 Claims, No Drawings

STABILIZED DRY CULTURES OF LACTIC ACID-PRODUCING BACTERIA

BACKGROUND

Cultures of lactic acid bacteria for the commercial manufacture of cheese are more commonly preserved by liquid nitrogen-freezing of the culture, which are necessarily store and distributed in frozen condition. Such cryogenic preservation is reasonably satisfactory where the culture manufacturer and the cheese companies have and maintain the necessary freezing and refrigeration equipment. Frozen cultures of certain lactic acid bacteria are also used for the commercial manufacture of yogurt and acidophilus milk. For home preparation of yogurt and acidophilus milk, frozen cultures are not satisfactory because of their cost and the handling problems involved.

In Europe and the United States, the commercial practice has therefore been to distribute dried cultures of yogurt and acidophilus producing bacteria for home use. With such dried cultures, a serious problem of shelf-life stability has been encountered. Even though the dried cultures are often kept under refrigeration by the retailers, the products have objectionably short shelf-lives. The numbers of viable bacteria continually decreases with time during refrigerated storage. Without refrigeration, the dried cultures are rapidly inactivated. In order to assure that sufficient viable cells will be present to produce yogurt and acidophilus milk according to the manufacturer's instructions, it has been necessary to provide a 50 to 200% excess of the cells. This increases the costs and makes the use instructions inaccurate.

Similar considerations apply to the manufacture and distribution of yogurt and acidophilus bacteria in the form of tablets for oral consumption. The tableted dry cells are required to be stored under refrigeration, but, even, so, are subject to loss of cell viability with time. Consequently, where the tablets are labeled as containing a certain minimum count of active cells per tablet, to be safe, the manufacturer must incorporate an excess of cells at the time the tablets are manufactured, thereby assuring that the labeling will remain accurate while the product is in stock by retailers.

Prior to the present invention, commercially dried cultures of lactic acid-producing bacteria were known not to have sufficient stability for storage at room temperature. Adequate shelf-life could not be maintained unless the cultures were stored under refrigeration temperatures. The present invention therefore permits, for the first time, the distribution and retail handling of dried home use Yogurt and acidophilus cultures and tableted Yogurt and acidophilus bacteria without refrigeration.

DESCRIPTION OF INVENTION

As used in the present application, the term "Lactic Acid Bacteria" refers to the broad class of harmless lactic acid-producing bacteria. In general, such bacteria possess the ability to ferment simple carbohydrates, such as lactose or glucose, with lactic acid being at least one, and usually the most abundant, of the fermentation products. Among such Lactic Acid Bacteria are the following: *Streptococcus lactis*, *Streptococcus cremoris*, *Streptococcus diacetylactis*, *Streptococcus thermophilus*, *Lactobacillus bulgaricus*, *Lactobacillus acidophilus*, *Lactobacillus helveticus*, *Lactobacillus bifidus*, *Lactobacillus casei*, *Lactobacillus lactis*, *Lactobacillus plantarum*, *Lactobacillus delbrueckii*, *Lacktobacillus thermophilus*, *Lactobacillus fermetii*, and *Pediococcus cerevisiae*.

While not limited thereto, the present invention has particular utility and is particularly advantageous for preparing stabilized dried bacterial concentrates of *S. thermophilus*, *L. bulgaricus*, and *L. acidophilus*. The bacteria, *S. thermophilus* and *L. bulgaricus*, are sometimes designated or referred to as the yogurt bacteria, and are commonly used to produce Yogurt in the United States. In certain European countries, *S. thermophilus* and *L. acidophilus* are used to produce Yogurt. In the United States, a "Yogurt" culture is most commonly a mixture of *S. thermophilus* and *L. bulgaricus*. However, for the purpose of the present application, the term "Yogurt Bacteria" is used generically and is intended to include one or more strains of *L. bulgaricus*, *S. thermophilus*, or *L. acidophilus*, or a combination of two or three of these species.

In practicing the present invention, a pure or mixed culture of the desired lactic acid-producing bacteria is grown in a liquid medium which gives satisfactory growth of the culture(s) involved. Such a medium may be composed of protein or protein fractions, various fermentable carbohydrates growth stimulants, inorganic salts, buffers, etc.; or the medium may be sterile whole milk, skim milk, whey, or other natural substrates, or combinations thereof. The growth medium may be heated or sterilized to potentiate satisfactory growth. After the desired heat treatment, cooling and inoculation, the culture is allowed to develop under generally optimized incubation conditions of time and temperature. Depending on the organism(s) being grown, the incubation times may range from periods of 4 to 48 hours and the temperatures may vary from 15 to 50°C. It may also be desirable to control pH and dissolved oxygen. After satisfactory growth has been attained, the culture in its growth medium is cooled to between 0°–15°C.

In general, the method used for obtaining viable cells of lactic acid-producing bacteria does not involve any novel steps in itself, but is carried out in accordance with known procedures for culturing such bacteria. After a satisfactory bacterial population has been attained in a suitable growth medium, the pH of the broth may be lower than desirable for preparing a dried product. Typically, the final pH will range from 4.4 to 5.4. Before drying of the fermentation broth, it is advantageous to add an alkaline reagent, such as sodium hydroxide to adjust the pH upwardly to a pH more favorable to the stability of the bacteria. In general, as previously known, it is desirable to adjust the pH upwardly toward neutrality (pH 7), the adjustment being at least to pH 5.8. Any food-acceptable alkali can be used [NaOH, KOH, NH$_4$OH, Ca(OH)$_2$, etc.]. Adjustment to a pH of about 6.0 to 6.5 is preferred. By way of specific example, the pH may be raised by the addition of sodium hydroxide to a pH of about 6.2. Where other additives are to be incorporated in the growth medium which will effect its pH, such as the stability potentiators of this invention, the pH adjustment can be made last as a matter of convenience.

Prior to drying of the cells in the growth medium, the combination of potentiators is added. An ascorbate compound is one of the essential co-acting potentiators for achieving the enhanced stability. The term "ascorbate compound" as used in this specification and the appended claims refers to L-ascorbic acid (vitamin C) and its water-soluble edible salts. Such "edible" salts are those approved for use in human foods and are of food grade. The ascorbate compound should be incorporated in an amount equivalent on a molar basis to 4 to 20 parts by weight of L-ascorbic acid per each 100 parts of dry solids in the growth medium, namely the dry weight of the bacterial cells plus the dry weight of the other solids in the growth medium. On the same basis, the second potentiator is added in an amount equivalent on a molar basis to 1.5 to 20 (preferably 3 to 15) parts of monosodium glutamate per 100 parts of the said total dry solids in the fermentation medium. As used in the specification the terms "glutamate compound" and "aspartate compound" refer, respectively, to (a) glutamic acid and its edible water-soluble salts, and (b) aspartic acid and its edible water-soluble salts. A glutamate compound is preferred, which conveniently may be added as monosodium glutamate.

Where the growth medium is dried by freeze-drying, it is desirable to incorporate a cryoprotectant. Suitable known cryoprotectants include inositol, sorbitol, mannitol, glucose, sucrose, corn syrup, DMSO, starches and modified starches of all types, PVP, maltose, or other mono and disaccharides. The level of addition can range from 1.0 to 300 grams per liter of culture depending on the particular agent. An effective amount should be used to minimize cell damage on freezing. Where a different method of drying is employed, such as a heat drying procedure, the cryoprotectant will not be used, and in general, any of the various procedures for drying bacteria or servitive biological materials to a powder can be used. These include freeze drying, spray drying, roller and/or vacuum pan drying. In practicing the present invention, the preferred drying procedures are freeze drying or spray drying.

Comparative experiments demonstrating the important and unexpected results obtained by the present invention are set out below in Experiments A, B, C, and in the accompanying tables.

Experiment A

Two 2000 ml. aliquots of reconstituted nonfat milk solids (12% NFS) were inoculated with an active milk subculture of *L. acidophilus* at 1.0% and incubated for 8 hours at 104°F. Both aliquots of culture were cooled to 45°F. The pH of both was below 5.0 at this point. Sixty minutes prior to freeze drying, one 2000 ml. aliquot was adjusted to pH 6.55 with 50% NaOH and the other (the control) was left at pH 4.77. Both were then freeze dried. The shelf-life at 21°C. of the resulting dried powders is shown in Table A. Analysis for the number of viable organisms was made by a standard viable plate count method using a standard yogurt agar as the plating medium. The plates were incubated at 37°C. for 72 hours.

Table A

| Sample (L. acidophilus) | Viable Plate Count (VPC) After 0 Days | VPC After 20 Days |
| --- | --- | --- |
| pH 4.77 (no adjustment) | 72.6 × 10⁸ | 0.4 × 10⁸ |
| pH 6.55 | 87.6 × 10⁸ | 20.9 × 10⁸ |

Experiment B

The conditions and procedures were the same as in Experiment A except that only one 2000 ml. aliquot was prepared. To this was added 25 gm. monosodium glutamate (MSG), the pH was adjusted to 6.55 with 50% NaOH. After a 60 minute holding period for equilibration, the fermentation medium containing the *L. acidophilus* cells was freeze-dried. Shelf-life was determined at 21°C. with the following results:

Table B

| Sample (L. acidophilus) | VPC After 0 Days | VPC After 20 Days |
| --- | --- | --- |
| pH 6.55 +MSG | 78.2 × 10⁸ | 17.2 × 10⁸ |

Experiment C

Similar conditions as in Experiment A were employed, only this time both 2000 ml. aliquots were adjusted to pH 6.00 prior to freeze drying; one 2000 ml. aliquot also received 25 grams of L-ascorbic acid (mixed in prior to pH adjustment). The pH of 6.00 was used rather than 6.55 because of lower resulting moistures in the powder. Both were freeze dried. The shelf-life at 21°C. of the resulting dried powders is set out in Table C.

Table C

| Sample (L. acidophilus) | VPC After 0 Days | VPC After 20 Days |
| --- | --- | --- |
| pH 6.00 | 114.0 × 10⁸ | 8.6 × 10⁸ |
| pH 6.00 + 25 grams L-ascorbic acid | 113.6 × 10⁸ | 39.6 × 10⁸ |

Experiment D 2000 ml. of *L. acidophilus* culture was prepared as in Experiment A, only the pH was adjusted to 6.00, as in Experiment B, with 50% NaOH after the addition of 25 grams of L-ascorbic acid, and 25 grams of monosodium glutamate (MSG). The sample was freeze-dried. The results of a shelf-life study are reported in Table D.

Table D

| Sample (L. acidophilus) | VPC After 0 Days | VPC After 20 Days |
| --- | --- | --- |
| pH 6.00 + 25 grams ascorbic acid and 25 grams MSG | 99.3 × 10⁸ | 90.3 × 10⁸ |

The foregoing experimental results can be more readily compared on the basis of the following summary table.

SUMMARY TABLE (Experiments A, B, C and D)

| Treatment | % Decrease in VPC During Storage For 20 Days at 21°C. |
| --- | --- |
| None | 99.45% |

SUMMARY TABLE-Continued (Experiments A, B, C and D)

| Treatment | % Decrease in VPC During Storage For 20 Days at 21 C. |
|---|---|
| pH adjustment only | 84.27% |
| PH adjustment plus MSG | 78.00% |
| pH adjustment plus ascorbic acid | 65.14% |
| pH adjustment plus ascorbic acid and MSG | 9.06% |

Embodiments of the present invention, which may be adapted to commercial practice, are presented in the following Examples I–IV. It will be understood that the negative controls, referred to as "Old Method" are included only for the purpose of comparison, and that the procedures referred to as "New Method" represent the embodiments of the present invention.

EXAMPLE I

Two 2000 ml. aliquots of reconstituted nonfat milk (12% NSF) were heated at 116°C. for 12 minutes. They were then tempered to 40°C. and inoculated at 1.0% with an appropriate culture of *Lactobacillus bulgaricus* containing approximately one billion viable cells per cc. The two aliquots so inoculated were then incubated at 40°C. for 8 hours at which time they were cooled rapidly in ice water to 5°C. One of the 2000 ml. fermented cultures was labeled New Method and received the following treatment: 40 grams of ascorbic acid, 25 grams of monosodium glutamate (MSG) and 25 grams of inositol were added with constant mixing; the pH was then adjusted to 6.10 with a 50% solution of sodium hydroxide. To the other 2000 ml. fermented culture labeled Old Method no such treatment was given. This latter culture should be regarded as the control. The two cultures were then freeze-dried in a conventional manner and the resulting powders were stored at 21°C. and appropriate viable plate counts were made initially on Hansen's Yogurt Agar and after 1, 2, and 3 months. The results are tabulated below in Table I:

Table I (*L. bulgaricus*)

| Storage Time at 21°C. | "Old Method" (Viable Count per gram) | "New Method" (Viable Count per gram) |
|---|---|---|
| 0 (immediately after drying) | $12 \times 10^8$ | $33 \times 10^8$ |
| 1 month | Less than $1 \times 10^7$ | $34 \times 10^8$ |
| 2 months | Less than $1 \times 10^7$ | $29 \times 10^8$ |
| 3 months | Less than $1 \times 10^7$ | $25 \times 10^8$ |

EXAMPLE II

The same procedure was used as for Example I, except *Lactobacillus helveticus* was the test organism. The storage results on the resulting freeze-dried powders are shown below in Table II:

Table II (*L. helveticus*)

| Storage Time at 21°C. | "Old Method" (Viable Count per gram) | "New Method" (Viable Count per gram) |
|---|---|---|
| 0 (immediately after drying) | $47 \times 10^8$ | $55 \times 10^8$ |
| 1 month | $11 \times 10^8$ | $39 \times 10^8$ |
| 2 months | $1.3 \times 10^7$ | $40 \times 10^8$ |
| 3 months | Less than $1.0 \times 10^7$ | $36 \times 10^8$ |

EXAMPLE III

The procedure outlined in Example I was used with the following exceptions: two 10,000 ml. aliquots of reconstituted nonfat milk (16% NFS) were used as culture media; *Lactobacillus acidophilus* was the test organism; the two resulting fermented cultures were spray-dried on a small size spray drier with a culture feed rate of 12–15 ml./minute, a nozzle velocity of 3.5 kg./cm² and an outlet temperature of 50°–60°C.

The storage results on these two types of spray-dried powders are tabulated below in Table III:

Table III (*L. acidophilus*)

| Storage Time at 21°C. | "Old Method" (Viable Count per gram) | "New Method" (Viable Count per gram) |
|---|---|---|
| 0 (immediately after drying) | $16 \times 10^8$ | $107 \times 10^8$ |
| 1 month | Less than $1 \times 10^6$ | $57 \times 10^8$ |
| 2 months | Less than $1 \times 10^6$ | $11 \times 10^8$ |
| 3 months | Less than $1 \times 10^6$ | $3 \times 10^8$ |

EXAMPLE IV

The procedure outlined in Example I was used with the following exceptions: *Streptococcus cremoris* was the test organism; incubation was at 21 C. for 16 hours; 20 grams of ascorbic acid, 12.5 grams of monosodium glutamate and 12.5 grams of inositol were added per 2000 ml. of fermented culture; the pH was adjusted to 6.25 with a 50% solution of sodium hydroxide; an untreated culture was still used as a control; the culture media was prepared as two 2000 ml. aliquots of reconstituted nonfat milk (16% NFS); and a standard lactic agar (Ellikers) was used to test the viable plate count. The results aare tabulated below in Table IV:

Table IV (*S. cremoris*)

| Storage Time at 21°C. | "Old Method" (Viable Count per gram) | "New Method" (Viable Count per gram) |
|---|---|---|
| 0 (immediately after drying) | $37 \times 10^8$ | $36 \times 10^8$ |
| 1 month | $1.1 \times 10^7$ | $6.6 \times 10^8$ |
| 3 months | $1.2 \times 10^5$ | $1.3 \times 10^8$ |

EXAMPLE V

The conditions and procedures were the same as in Example I, except that 23 grams sodium aspartate was substituted for the MSG.

Table V

| | (L. bulgaricus) | |
|---|---|---|
| Storage Time at 21°C. | "Old Method" (Viable Count per gram) | "New Method" (Viable Count per gram) |
| 0 (immediately after drying) | $12 \times 10^8$ | $22 \times 10^8$ |
| 1 month | Less than $1 \times 10^7$ | $19 \times 10^8$ |
| 2 months | Less than $1 \times 10^7$ | $19 \times 10^8$ |
| 3 months | Less than $1 \times 10^7$ | $17 \times 10^8$ |

As illustrated by the foregoing examples, prior to drying, both of the potentiators are incorporated into the culture medium, and the pH adjustment is made. Conveniently, the pH adjustment can be made last, since the addition of the potentiators will cause a small change in pH. These additives, should be dissolved in the liquid medium in order to make effective contact with the cells prior to drying. A short waiting period after the addition of the potentiators and after the pH adjustment is desirable. The cells should be permitted to equilibrate with the additives. The minimum holding time has not been determined, but, in general, it is desirable to hold the cells in contact with the dissolved additives for 30 to 60 minutes, or longer. In commercial practice, a holding time of 1 to 2 hours has been used. Prolonged holding is not required. The culture medium containing the additives is preferably maintained at a temperature between 0° and 15°C., the temperature used being a non-freezing temperature and one at which the cells are protected against loss of viability. Where the commercial processing of liquid culture to the dry product is delayed, such as overnight, the holding can be continued under the specified refrigeration condition. In the presence of the additives, and in storage at a non-freezing temperature below 15°C., the cells in the culture medium remain viable after several days of storage. However, there is no reason for delaying the drying, and usually, the culture is subjected to freeze-drying or spray-drying within a few hours (2–6 hours) after incorporation of the additives.

The term "dried" as used herein is intended to refer to products containing not over 5% moisture by weight. Such products, as initially produced, will be in the form of a fine powder or granules. Usually, by either freeze-drying or spray-drying, the average moisture content of the resulting product can be reduced to at least 2.5 to 3.5% by weight. There is no minimum moisture content for the dry product, although as a practical matter it is difficult to produce products containing less than about 1–2% water by weight. Preferably, the stabilized dried concentrates of lactic acid-producing bacteria cells produced in accordance with the present invention contain less than 3.5% water by weight, such as about 2.5 to 3% moisture.

Where it is desired to produce tablets from the stabilized dry concentrates having a high number of viable cells, the stabilized dried material can be mixed with a tableting sugar, such as lactose or sucrose, the tableting sugar preferably being in a granular form adapting it to function as a tablet binder. For example, from 5–10 parts by weight of the stabilized dried fermentation solids containing the cell concentrate can be mixed with from 90–95 parts of the tableting sugar, and the mixture formed into tablets on standard tableting machines.

Conventional freeze drying and spray drying equipment can be employed for the purpose of the present invention. In the foregoing examples, the freeze drying was carried out with a freeze drier manufactured by Alloy Products, Inc., Waukesha, Wis., and the spray drying was carried out with a Nichols/Niro laboratory spray drier.

We claim:

1. Stabilized dried culture medium solids providing a concentrate of viable harmless lactic acid-producing bacteria cells, said solids having been prepared by drying a fermented culture containing said cells together with other solids present on completion of the incubation of a culture of said cells in an aqueous nutrient-containing medium, said medium having been dried to a moisture content of below 5% by weight after the pH thereof has been adjusted to a pH favorable to the stability of said cells on drying, wherein the improvement is characterized by having present in said solids a combination of stabilization potentiators comprising (a) an ascorbate compound selected from L-ascorbic acid and the edible water-soluble salts thereof, and (b) a second potentiator selected from the class consisting of glutamic acid, aspartic acid, and the edible water-soluble salts thereof, said potentiators having been dissolved in said fermented culture for effective contact with said cells before said drying, and in amounts for said ascorbate compound equivalent on a molar basis to 4 to 20 parts by weight L-ascorbic acid and for said second potentiator to 1.5 to 20 parts by weight of monosodium glutamate per each 100 parts of the moisture-free combined weight of said cells and said other fermentation solids.

2. The stabilized dried culture medium solids of claim 1 in which said second potentiator is used in an amount equivalent on a molar basis to 3 to 15 parts by weight of monosodium glutamate per each 100 parts of the moisture-free combined weight of said cells and said other fermentation solids.

3. The stabilized dried culture medium solids of claim 1 in which said second potentiator is a glutamate compound.

4. The stabilized dried culture medium solids of claim 1 in which said second potentiator is monosodium glutamate.

5. The stabilized dried culture medium solids of claim 1 in which said bacteria cells are selected from the class consisting of Streptococcus thermophilus, Lactobacillus bulgaricus, Lactobacillus acidophilus, and mixtures thereof.

6. The stabilized dried culture medium solids of claim 1 in which said bacteria cell are Lactobacillus helveticus.

7. The stabilized dried culture medium solids of claim 1 in which said bacteria cell are Streptococcus cremoris.

8. The stabilized dried culture medium solids of claim 1 in which said fermented culture has been subjected to spray drying.

9. The stabilized dried culture medium solids of claim 1 in which said fermented culture has been subjected to freeze drying, and an effective amount of a cryoprotectant is added to said fermented culture prior to said freeze drying.

10. Stabilized dried culture medium solids providing a concentrate of viable harmless lactic acid-producing bacteria cells, said solids having been prepared by drying a fermented culture containing said cells together with other solids present on completion of the incubation of a culture of said cells in an aqueous nutrient-containing medium, said medium having been dried to a moisture content of below 5% by weight after the pH thereof has been adjusted to a pH favorable to the stability of said cells on drying, wherein the improvement is characterized by having present in said solids a combination of stabilization potentiators comprising (a) an ascorbate compound selected from L-ascorbic acid and the edible water-soluble salts thereof, and (b) a second potentiator comprising a glutamate compound selected from glutamic acid and the edible water-soluble salts thereof, said potentiators having been dissolved in said fermented culture for effective contact with said cells before said drying, and in amounts for said ascorbate compound equivalent on a molar basis to 4 to 20 parts by weight L-ascorbic acid and for said second potentiator to 3 to 15 parts by weight of monosodium glutamate per each 100 parts of the moisture-free combined weight of said cells and said other fermentation solids.

11. The stabilized dried culture medium solids of claim 10 in which said ascorbate compound is L-ascorbic acid.

12. The stabilized dried culture medium solids of claim 11 in which said glutamate compound is monosodium glutamate.

13. The stabilized dried culture medium solids of claim 12 in which said bacteria cells are selected from the class consisting of *Streptococcus thermophilus*, *Lactobacillus bulgaricus*, *Lactobacillus acidophilus*, and mixtures thereof.

14. The stabilized dried culture medium solids of claim 12 in which said bacteria cell are *Lactobacillus helveticus*.

15. The stabilized dried culture medium solids of claim 12 in which said bacteria cell are *Streptococcus cremoris*.

16. The stabilized dried culture medium solids of claim 13 in which said fermented culture has been subjected to spray drying.

17. The stabilized dried culture medium solids of claim 13 in which said fermented culture has been subjected to freeze drying, and an effective amount of cryoprotectant is added to said fermented culture prior to said freeze drying.

* * * * *

UNITED STATES PATENT OFFICE
CERTIFICATE OF CORRECTION

Patent No. 3,897,307                Dated July 29, 1975

Inventor(s) Randolph S. Porubcan and Robert L. Sellars

It is certified that error appears in the above-identified patent and that said Letters Patent are hereby corrected as shown below:

Col. 1, line 8 change "store" to --stored--.

Col. 8, lines 37, 39, and 45 change "to" to --from--.

Col. 9, lines 25 and 27 change "to" to --from--.

Signed and Sealed this

Twelfth Day of June 1979

[SEAL]

Attest:

RUTH C. MASON
Attesting Officer

DONALD W. BANNER
Commissioner of Patents and Trademarks